United States Patent
Kim

(10) Patent No.: US 8,655,373 B2
(45) Date of Patent: Feb. 18, 2014

(54) METHOD AND APPARATUS FOR WIRELESS LOCATION MEASUREMENT

(75) Inventor: Kanghee Kim, Daejeon (KR)

(73) Assignee: Electronic and Telecommunications Research Institute, Daejeon (KR)

(*) Notice: Subject to any disclaimer, the term of this patent is extended or adjusted under 35 U.S.C. 154(b) by 118 days.

(21) Appl. No.: 12/892,344

(22) Filed: Sep. 28, 2010

(65) Prior Publication Data

US 2011/0130152 A1 Jun. 2, 2011

(30) Foreign Application Priority Data

Sep. 28, 2009 (KR) .................. 10-2009-0091639
Sep. 28, 2010 (KR) .................. 10-2010-0093697

(51) Int. Cl.
*H04W 4/00* (2009.01)

(52) U.S. Cl.
USPC ..................... 455/456.1; 370/329

(58) Field of Classification Search
USPC ............ 342/364; 370/329; 455/456.1, 456.2, 455/456.3
See application file for complete search history.

(56) References Cited

U.S. PATENT DOCUMENTS

| | | | |
|---|---|---|---|
| 5,510,800 A | 4/1996 | McEwan | |
| 6,469,665 B2 | 10/2002 | Porcino | |
| 7,358,899 B1 | 4/2008 | Ville et al. | |
| 7,383,053 B2 | 6/2008 | Kent et al. | |
| 7,592,956 B2 | 9/2009 | McPherson et al. | |
| 7,692,587 B2 | 4/2010 | Rabinowitz et al. | |
| 2002/0149518 A1 | 10/2002 | Haataja et al. | |
| 2002/0181625 A1* | 12/2002 | Gorokhov et al. | 375/346 |
| 2003/0036390 A1* | 2/2003 | Villier et al. | 455/456 |
| 2003/0064733 A1 | 4/2003 | Okanoue et al. | |
| 2004/0203871 A1* | 10/2004 | Geier et al. | 455/456.1 |
| 2005/0184908 A1 | 8/2005 | Richards | |
| 2010/0027486 A1* | 2/2010 | Gorokhov et al. | 370/329 |

FOREIGN PATENT DOCUMENTS

JP 2002-135833 5/2002
KR 10-2009-0013082 2/2009

OTHER PUBLICATIONS

"Distance Dependence of Microwave Delay Spreads Measured in Urban Quasi Line-of-Sight Environments", IEICE Trans. On Communications, vol. E82-B, No. 12, pp. 1997-2003, Dec. 1999.
U.S. Office Action mailed Sep. 18, 2012 in corresponding U.S. Appl. No. 12/892,385.
U.S. Office Action mailed Mar. 15, 2013 in corresponding U.S. Appl. No. 12/892,385.
U.S. Appl. No. 12/892,385, filed Sep. 28, 2010, Kanghee Kim, et al., Electronics and Telecommunications Research Institute.

* cited by examiner

*Primary Examiner* — Patrick Edouard
*Assistant Examiner* — Myron K Wyche
(74) *Attorney, Agent, or Firm* — Staas & Halsey LLP

(57) ABSTRACT

A method for wireless location measurement of a receiver is provided. The method includes: estimating radio channels of a plurality of frequency domains respectively corresponding to a plurality of transmitters by using received signals from the plurality of transmitters; extracting a plurality of propagation delay tab profiles based on the radio channels of the plurality of frequency domains; calculating the distance between each of the transmitters corresponding to the respective propagation delay tab profiles and the receiver by using the propagation delay tab profiles; and estimating the location of the receiver by using the distance between each transmitter and the receiver.

9 Claims, 5 Drawing Sheets

METHOD AND APPARATUS FOR WIRELESS LOCATION MEASUREMENT

CROSS-REFERENCE TO RELATED APPLICATION

This application claims priority to and the benefit of Korean Patent Application No. 10-2009-0091639 and 10-2010-0093697 filed in the Korean Intellectual Property Office on Sep. 28, 2009 and Sep. 28, 2010, the entire contents of which are incorporated herein by reference.

BACKGROUND OF THE INVENTION (a) Field of the Invention

The present invention relates to a method and apparatus for wireless location measurement.

(b) Description of the Related Art

Wireless location measurement is a technology of obtaining information about position, speed, or other characteristics of an object by using wireless communication.

Wireless location measurement methods include an AOA (angle of arrival) method using received angles, an RSSI (received signal strength indicator) method using received signal strength, a TOA (time of arrival) method using arrival time of radio waves, a TDOA (time difference of arrival) method using an arrival time difference between radio waves, a DSOA (delay spread of arrival) method using delay spread of radio waves, and so on. Among these wireless location measurement methods, location measurement using characteristics of a radio channel is used for a wireless location measurement apparatus to calculate a propagation delay tab profile and calculate the distance between a transmitter and a receiver using information contained in the propagation delay tab profile.

The propagation delay tab profile can be obtained using a correlator. The correlator estimates a radio channel in a time domain by using preambles included in a received superframe. For example, the wireless location measurement apparatus can measure a location by performing first synchronization using a primary preamble included in a received superframe and then second synchronization using a secondary preamble followed by the primary preamble. In this manner, the correlator measures a location using a limited number of preambles of a superframe, so the location measurement period is longer than the duration of the superframe (e.g., 20 ms). Moreover, if the correlator accumulates received signals to extract a propagation delay tab profile, a period of time that is a plurality of times longer than the superframe duration is required. Thus, the position of the wireless location measurement apparatus may change during this period of time. As a result, the accuracy of location measurement may be lowered. The aforementioned method of extracting a propagation delay tab profile using a correlator may affect the performance of the wireless location measurement apparatus since the location measurement period is long and the amount of correlation calculation is large because a limited number of preambles are used.

SUMMARY OF THE INVENTION

The present invention has been made in an effort to provide a method for location measurement, which simply extracts a propagation delay tab profile using signals frequently received by a wireless location measurement apparatus.

An exemplary embodiment of the present invention provides a method for wireless location measurement of a receiver, the method including: estimating a plurality of radio channels in a frequency domain respectively corresponding to a plurality of transmitters by using received signals from the plurality of transmitters; extracting a plurality of propagation delay tab profiles based on the plurality of radio channels in the frequency domain; calculating the distance between each of the transmitters corresponding to the respective propagation delay tab profiles and the receiver by using the propagation delay tab profiles; and estimating the location of the receiver by using the distance between each transmitter and the receiver.

The received signals may include pilot signals included in a received subframe.

The estimating of the plurality of radio channels in the frequency domain may include accumulating the pilot signals received from each of the transmitters and estimating the radio channels in the frequency domain corresponding to the respective transmitters by using the accumulated pilot signals.

The accumulating of the pilot signals may include adding together pilot signals included in the same frequency domain and interpolating pilot signals included in different frequency domains.

The estimating of the plurality of radio channels in the frequency domain may include compensating the received signals from the transmitters by a 1-tab equalizer and estimating the radio channels corresponding to the respective transmitters in the frequency domain.

The extracting of the plurality of propagation delay tab profiles may include converting the radio channels in the frequency domain into radio channels in a time domain respectively and extracting the plurality of propagation delay tab profiles based on the respective radio channels in the time domain.

An exemplary embodiment of the present invention provides an apparatus for wireless location measurement, the apparatus including: a frequency domain channel estimator for estimating a radio channel in a frequency domain using received signals from a transmitter; a converter for converting the radio channel in the frequency domain into a radio channel in a time domain; a propagation delay tab extractor for extracting a propagation delay tab profile based on the radio channel in the time domain; and a location measurement unit for determining the location of a receiver by calculating the distance between the transmitter and the receiver by using the propagation delay tab profile.

The received signals may include pilot signals included in a received subframe.

The frequency domain channel estimator may estimate the radio channel in the frequency domain using the pilot signals accumulated.

The frequency domain channel estimator may compensate the received signals.

DETAILED DESCRIPTION OF THE EMBODIMENTS

Figure 1:
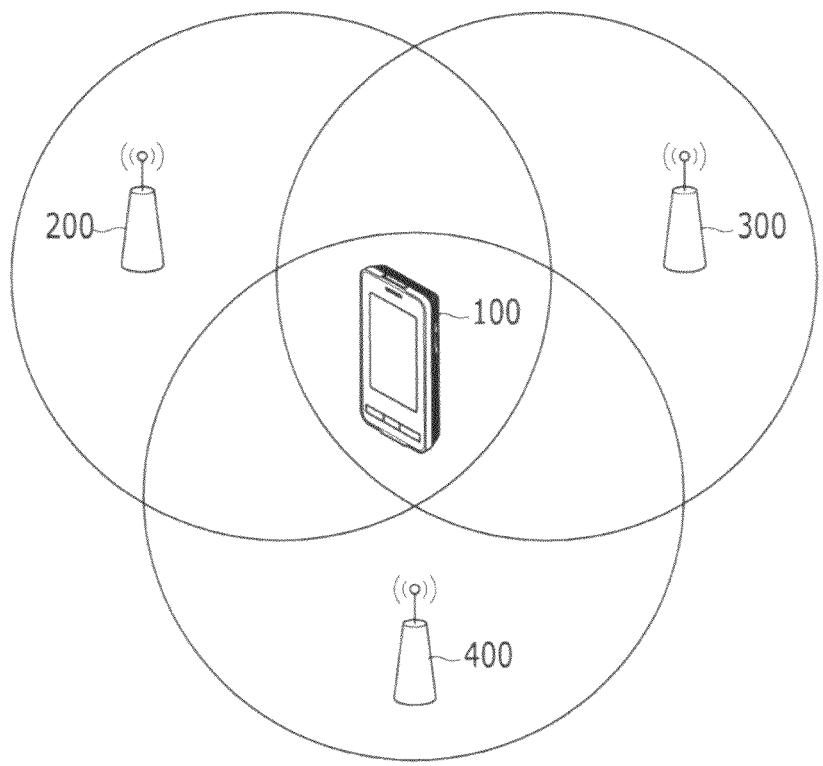
FIG. 1 is a view schematically showing a wireless location measurement system according to one exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Now, a method and apparatus for wireless location measurement according to one exemplary embodiment of the present invention will be described in detail with reference to the accompanying drawings.

FIG. 1 is a view schematically showing a wireless location measurement system according to one exemplary embodiment of the present invention.

Referring to FIG. 1, the wireless location measurement system includes a receiver 100 and a plurality of transmitters 200 to 400. The transmitters 200 to 400 are devices for transmitting signals for location measurement to a radio channel, and the receiver 100 includes a wireless location measurement apparatus that receives signals to measure a location. The receiver 100 receives signals from the transmitters 200 to 400 to calculate the distance of the transmitters 200 to 400 from each other. Then, the receiver 100 draws a plurality of circles, the centers of which are the transmitters 200 to 400, respectively, and the radius of which correspond to the distance between the transmitters 200 to 400 and the receiver 100, and then defines an overlapping region of the plurality of circles as the location of the receiver 100. If the distance between the receiver 100 and each of the transmitters 200 to 400 is known, the overlapping position of the plurality of circles can be obtained using algorithms, such as the method of least squares, based on triangulation.

The distance between the receiver 100 and each of the transmitters 200 to 400 is calculated using the characteristics of a radio channel. To this end, the receiver 100 extracts a propagation delay tab profile including a plurality of delay tabs by using received signals.

Figure 2:
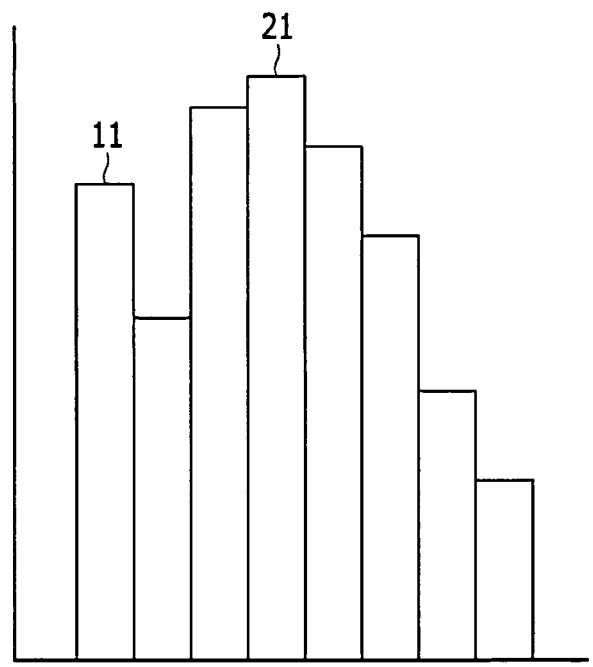
FIG. 2 is a view showing a propagation delay tab profile according to one exemplary embodiment of the present invention.

FIG. 2 is a view showing a propagation delay tab profile according to one exemplary embodiment of the present invention.

Referring to FIG. 2, the horizontal axis of the propagation delay tab profile represents the delay time of radio waves, and the vertical axis thereof represents signal strength. Based on the propagation delay tab profile, the receiver 100 is able to know the delay time of tabs including a first delay tab 11 and a peak delay tab 21 having the highest signal strength, and is also able to obtain a delay spread value, which is a level of delay spread. The delay time or the delay spread value obtained based on the propagation delay tab profile is proportional to distance. Using this, the distance between the transmitters and the receiver can be calculated.

The above propagation delay tab profile can be extracted using radio channel information estimated in a time domain. The radio channel in the time domain is estimated using the correlation between a received signal and a known transmitted signal. Since the primary preamble and secondary preamble of a superframe are used as location measurement signals, the location measurement period may be long and the amount of correlation calculation may be large. Therefore, due to the location measurement period, it may be difficult for the receiver 100 to use a method of accumulating received signals to increase the accuracy of location measurement.

Next, a method in which a wireless location measurement apparatus extracts a propagation delay tab profile using a radio channel estimated in a frequency domain will be described.

Figure 3:
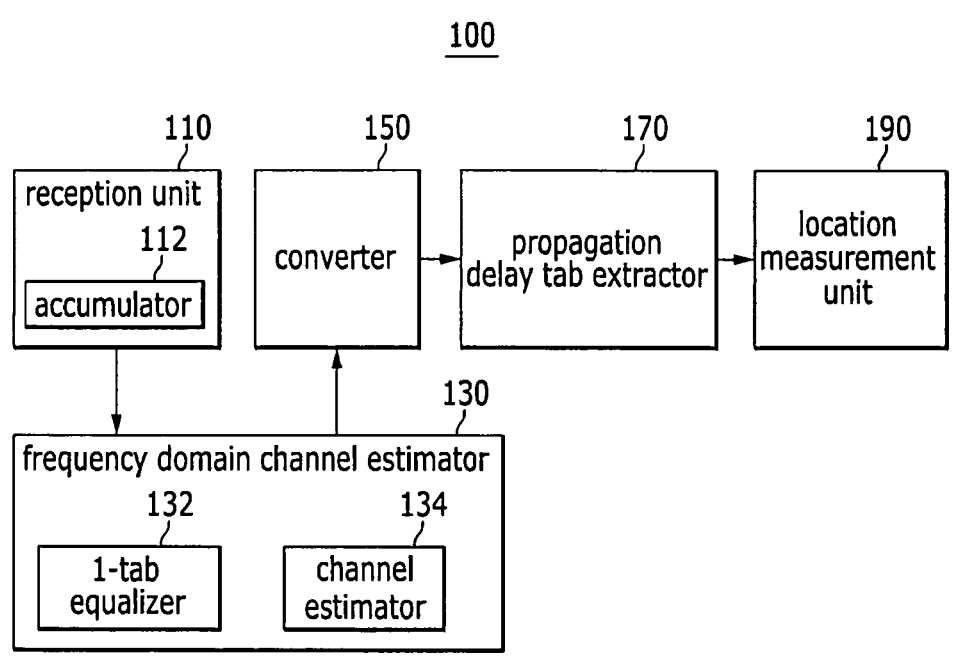
FIG. 3 is a view showing a wireless location measurement apparatus according to one exemplary embodiment of the present invention.

FIG. 3 is a view showing a wireless location measurement apparatus according to one exemplary embodiment of the present invention.

Referring to FIG. 3, the wireless location measurement apparatus of the receiver 100 includes a reception unit 110, a frequency domain channel estimator 130, a converter 150, a propagation delay tab extractor 170, and a location measurement unit 190.

The reception unit 110 receives signals from a transmitter (e.g., 200 of FIG. 1). The reception unit 110 may include an accumulator 112 for accumulating received signals together. In this case, the reception unit 110 is able to accumulate the signals received from the transmitter 200 and send them to the frequency domain channel estimator 130.

The frequency domain channel estimator 130 estimates a radio channel in the frequency domain by using input signals. The input signals may be signals received from the reception unit 110 or the accumulated signals. The frequency domain channel estimator 130 may include a 1-tab equalizer 132 and a channel estimator 134. The 1-tab equalizer 132, which is a device for compensating distortion of a radio channel, obtains compensation coefficients for each frequency included in a received signal and compensates a signal corresponding to each frequency. The 1-tab equalizer 132 is easily implemented compared to the correlator, and has a lower amount of calculation than that of the correlator. Next, the channel estimator 134 estimates a radio channel in the frequency domain by using signals equalized.

The converter 150 converts the radio channel estimated in the frequency domain into a time domain radio channel which is the radio channel in the time domain. The converter 150 may perform conversion from the frequency domain to the time domain by Fourier transform, such as Fast Fourier Transform (FFT) or Inverse Fast Fourier Transform (IFFT).

The propagation delay tab extractor 170 extracts a propagation delay tab profile corresponding to an input signal. The input signal is information about the radio channel in the time domain, which is an output of the converter 150.

The location measurement unit 190 measures a location using a propagation delay tab profile. There may be a variety of methods for location measurement using a propagation delay tab profile. For example, a location may be measured using the delay time of a first delay tab, the delay time of a peak delay tab, a delay spread value, or a delay tab having signal strength higher than a threshold value.

Figure 4:
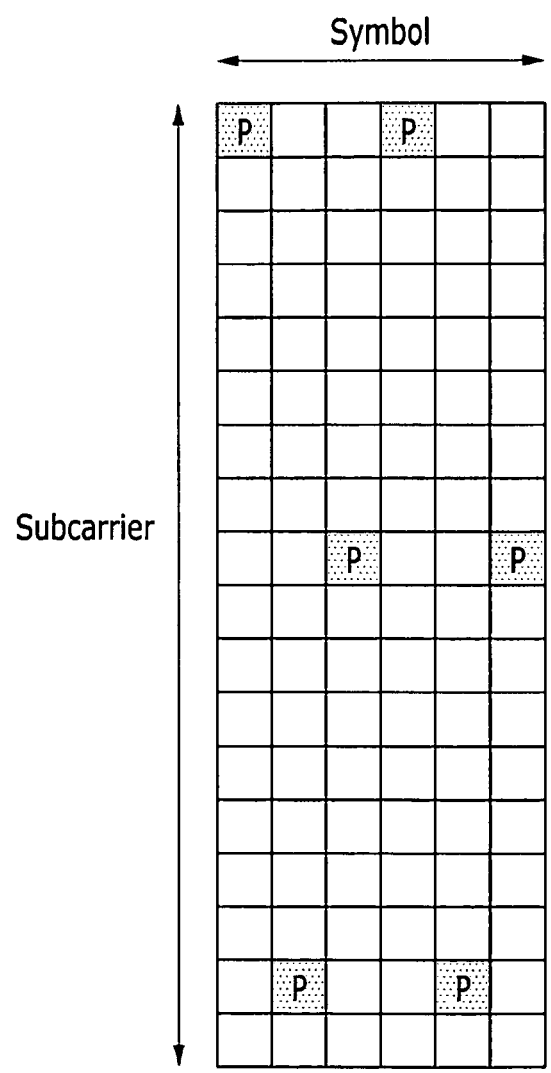
FIG. 4 is a view showing a location measurement signal according to one exemplary embodiment of the present invention.

FIG. 4 is a view showing a location measurement signal according to one exemplary embodiment of the present invention.

Referring to FIG. 4, the frequency domain channel estimator (130 of FIG. 3) of the receiver 100 estimates a channel using a pilot signal P included in a subframe.

The pilot signal P is a signal transmitted in a subframe so that the receiver 100 can estimate a channel. For example, as shown in FIG. 4, a plurality of pilot signals P are included in one subframe. A subframe is positioned in a frame included in a superframe. Thus, by using a pilot signal P as a location measurement signal, the receiver 100 is able to frequently receive location measurement signals compared to the method of using a preamble included in the superframe. Accordingly, by performing location measurement using frequently received pilot signals P, location measurement signals can be accumulated within a short time, thereby enabling channel estimation.

As the pilot signals P are disposed in a plurality of time or frequency domains within one subframe, a plurality of pilot signals P included in at least one frame can be accumulated by sum or interpolation. For example, pilot signals P included in the same frequency domain may be added together, and pilot signals P included in different frequency domains may be interpolated. Using pilot signals P as location measurement signals in this manner, location measurement signals can be accumulated within a short period of time corresponding to a subframe in a fast changing channel.

Moreover, the receiver 100 can simultaneously extract information of a plurality of channels by using a plurality of antennas. Thus, pilot signals P respectively corresponding to the plurality of channels can be extracted within a short time, e.g., during a period of time corresponding to a subframe.

Figure 5:
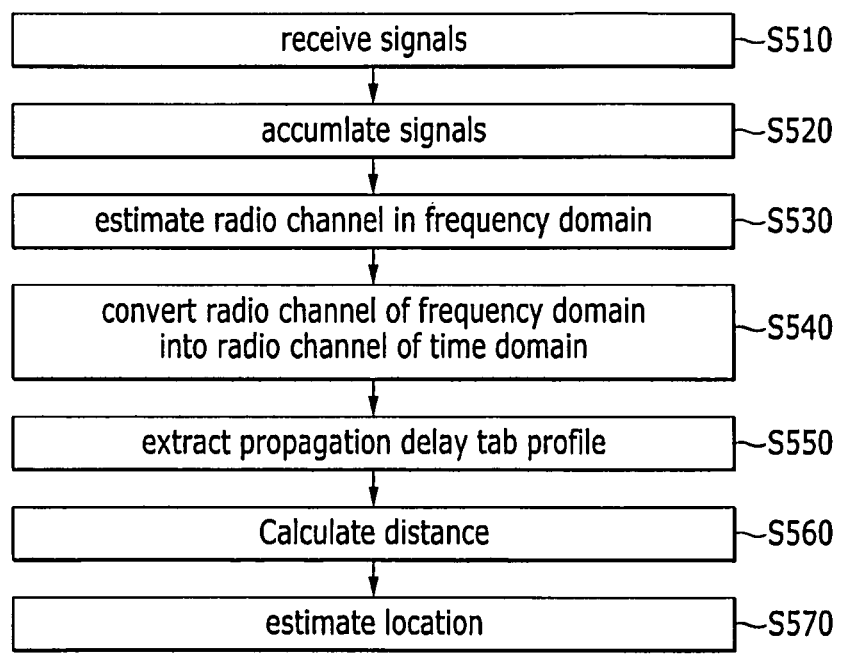
FIG. 5 is a view showing a wireless location measurement method according to one exemplary embodiment of the present invention.

FIG. 5 is a view showing a wireless location measurement method according to one exemplary embodiment of the present invention.

Referring to FIG. 5, the receiver 100 receives signals from the transmitter (e.g., 200 of FIG. 1) (S510). The receiver 100 may accumulate the received signals together to increase the accuracy of location measurement (S520).

The receiver 100 estimates or identifies a radio channel in a frequency domain using the received signals (S530). The receiver 100 can estimate a radio channel of a frequency domain by compensating the received signals by a 1-tab equalizer. At this point, the receiver 100 may estimate or identify the radio channel of the frequency domain using pilot signals P included in a subframe.

The receiver 100 firstly converts the radio channel in the frequency domain into a radio channel of a time domain in order to extract a propagation delay tab profile based on the radio channel in the frequency domain (S540). The receiver 100 can convert the radio channel in the frequency domain into the radio channel in the time domain by Fourier transform such as FFT or IFFT.

Next, the receiver 100 extracts a propagation delay tab profile based on the radio channel in the time domain (S550).

The receiver 100 calculates the distance between the receiver 100 and the transmitter 200 by using the propagation delay tab profile (S560).

Then, the receiver 100 additionally calculates the distance from the receiver 100 to another transmitter (e.g., 300 or 400 of FIG. 1) to estimate the location of the receiver 100 (S570). The method of location measurement may vary. For example, when drawing a plurality of circles, the centers of which are respectively the transmitters 200 to 400 and the radii of which correspond to the distance between the transmitters 200 to 400 and the receiver 100, an overlapping region of the plurality of circles may be estimated as the location of the receiver 100.

As explained above, by enabling the receiver 100 to extract a propagation delay tab profile using the frequency domain channel estimator 130 and the converter 150, this method is easier to implement compared to the method of extracting a propagation delay tab profile using a correlator in a time domain. Also, the location measurement period is short because pilot signals included in a subframe are used as location measurement signals.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for wireless location measurement of a receiver, the method comprising:
   identifying a plurality of radio channels in a frequency domain respectively corresponding to a plurality of transmitters by using received pilot signals from the plurality of transmitters;
   extracting a plurality of propagation delay tab profiles based on the identified plurality of radio channels in the frequency domain;
   calculating the distance between each of the transmitters corresponding to the respective propagation delay tab profiles and the receiver, by using respective propagation delay spread values obtained from the respective propagation delay tab profiles, wherein each of the propagation delay spread value is proportional to the distance between each transmitter and the receiver; and
   estimating the location of the receiver by using the distance between each transmitter and the receiver.

2. The method of claim 1, wherein the received signals comprise the pilot signals included in a received subframe.

3. The method of claim 2, wherein
   the identifying the plurality of radio channels in the frequency domain comprises:
   accumulating the pilot signals received from each of the transmitters; and
   identifying the radio channels in the frequency domain corresponding to the respective transmitters by using the accumulated pilot signals.

4. A method for wireless location measurement of a receiver, the method comprising:
   identifying a plurality of radio channels in a frequency domain respectively corresponding to a plurality of transmitters by using received pilot signals from the plurality of transmitters;
   extracting a plurality of propagation delay tab profiles based on the identified plurality of radio channels in the frequency domain;
   calculating the distance between each of the transmitters corresponding to the respective propagation delay tab profiles and the receiver, by using respective propagation delay spread values obtained from the respective propagation delay tab profiles, wherein each of the propagation delay spread value is proportional to the distance between each transmitter and the receiver; and
   estimating the location of the receiver by using the distance between each transmitter and the receiver, wherein the accumulating the pilot signals comprises adding together pilot signals included in the same frequency domain and interpolating pilot signals included in different frequency domains.

5. The method of claim 1, wherein the identifying the plurality of radio channels in the frequency domain comprises compensating the received signals from the transmitters by a 1-tab equalizer and estimating the radio channels corresponding to the respective transmitters in the frequency domain.

6. The method of claim 1, wherein
the extracting of the plurality of propagation delay tab profiles comprises:
converting the radio channels in the frequency domain into radio channels in a time domain respectively; and
extracting the plurality of propagation delay tab profiles based on the respective radio channels in the time domain.

7. An apparatus for wireless location measurement, the apparatus comprising:
a frequency domain channel estimator for identifying a radio channel in a frequency domain using received pilot signals from a transmitter;
a converter for converting the radio channel in the frequency domain into a radio channel in a time domain;
a propagation delay tab extractor for extracting a propagation delay tab profile based on the radio channel in the time domain; and
a location measurement unit for determining the location of the receiver by calculating the distance between the transmitter and the receiver by using a propagation delay spread value obtained from the propagation delay tab profile, wherein the propagation delay spread value is proportional to the distance between the transmitter and the receiver.

8. A method for wireless location measurement of a receiver, the method comprising:
identifying a plurality of radio channels in a frequency domain respectively corresponding to a plurality of transmitters by using received pilot signals from the plurality of transmitters;
extracting a plurality of propagation delay tab profiles based on the identified plurality of radio channels in the frequency domain;
calculating the distance between each of the transmitters corresponding to the respective propagation delay tab profiles and the receiver, by using respective propagation delay spread values obtained from the respective propagation delay tab profiles, wherein each of the propagation delay spread value is proportional to the distance between each transmitter and the receiver; and
estimating the location of the receiver by using the distance between each transmitter and the receiver, wherein the received signals comprises the pilot signals included in a received subframe.

9. The apparatus of claim 7, wherein the frequency domain channel estimator compensates the received signals.

* * * * *